(12) United States Patent
Eggimann et al.

(10) Patent No.: US 10,974,924 B2
(45) Date of Patent: Apr. 13, 2021

(54) CABLE PROCESSING MACHINE WITH MOVABLE GUIDE ELEMENTS AND METHOD FOR LAYING A CABLE IN A CABLE PROCESSING MACHINE

(71) Applicant: KOMAX HOLDING AG, Dierikon (CH)

(72) Inventors: Reto Eggimann, Rothenburg (CH); Dominik Staubli, Horw (CH)

(73) Assignee: KOMAX HOLDING AG, Dierikon (CH)

( * ) Notice: Subject to any disclaimer, the term of this patent is extended or adjusted under 35 U.S.C. 154(b) by 55 days.

(21) Appl. No.: 16/358,762

(22) Filed: Mar. 20, 2019

(65) Prior Publication Data
US 2019/0292003 A1    Sep. 26, 2019

(30) Foreign Application Priority Data
Mar. 23, 2018   (EP) .................................... 18163543

(51) Int. Cl.
*B65H 57/00*    (2006.01)
*B65H 57/12*    (2006.01)
*B65H 51/14*    (2006.01)

(52) U.S. Cl.
CPC ........... *B65H 57/003* (2013.01); *B65H 51/14* (2013.01); *B65H 57/12* (2013.01)

(58) Field of Classification Search
CPC ...... B65H 57/003; B65H 57/06; B65H 57/10; B65H 57/12; B65H 51/105; B65H 51/14
See application file for complete search history.

(56) References Cited

U.S. PATENT DOCUMENTS 5,820,008 A    10/1998   College

FOREIGN PATENT DOCUMENTS

| DE | 102009031076 B3 | * | 8/2010 | ........... H02G 1/1248 |
|----|-----|---|---|---|
| DE | 102009031076 B3 | | 8/2010 | |
| EP | 0423443 A1 | | 4/1991 | |
| EP | 0496049 B1 | | 5/1995 | |
| EP | 3219654 A1 | | 9/2017 | |
| WO | 2009141794 A2 | | 11/2009 | |
| WO | 2017129658 A1 | | 8/2017 | |

OTHER PUBLICATIONS

Machine Translation of DE 10 2009 031 076 B3, Aug. 19, 2010. (Year: 2010).*

* cited by examiner

*Primary Examiner* — William E Dondero
(74) *Attorney, Agent, or Firm* — William J. Clemens; Shumaker, Loop & Kendrick, LLP

(57) ABSTRACT

A cable processing machine includes a cable feeding device for moving a cable in a feed direction. The cable feeding device has a first guide element and a second guide element, between which elements the cable is guided at least in an operating mode of the cable processing machine. The spacing between the two guide elements is selectively variable. A method for laying a cable in the cable processing machine includes moving one or both of the guide elements relative to one another when the cable processing machine is shifted between the operating mode and a cable laying mode.

18 Claims, 6 Drawing Sheets

CABLE PROCESSING MACHINE WITH MOVABLE GUIDE ELEMENTS AND METHOD FOR LAYING A CABLE IN A CABLE PROCESSING MACHINE

FIELD

The invention relates to a cable processing machine which comprises a cable feeding device for moving a cable in a feed direction, the cable feeding device in turn comprising a first and a second belt drive, between which the cable is guided, it being possible to move the cable in the feed direction by contact with the driven belts of the belt drives. The invention further relates to a method for laying a cable in a cable processing machine of this kind.

BACKGROUND

Cable processing machines generally comprise cable feed drives, by means of which the cable to be processed is moved in a feed direction. One of the most popular forms of cable feed drives are what are known as belt drives, in which the cable is guided between two belt drives which each comprise driven belts. The cable is moved in the feed direction by means of contact with the driven belts. A cable processing machine of this kind is known from EP 3 219 654 A1, for example.

Another belt drive is described in EP 0 423 443 A1.

The belt drives are designed in particular such that one of the belt drives is arranged on a housing of the cable processing machine in a stationary manner, while the other is arranged on a carrier which is movable relative to the housing and thus relative to the stationary belt drive, in particular perpendicularly to the conveying plane of the cable, such that the belt drive can be opened for laying a cable and subsequently closed again for operation. Alternatively, cable feeding devices are also known, in which both belt drives are designed to be movable.

In addition to the belt drive, the cables in cable processing machines are guided through a plurality of guide units which ensure that the cable is moved along a predetermined conveying path inside the cable processing machine, thus making a safe, high-quality processing of the cable possible. Guide units usually have circular holes through which the cable is guided. When laying a new cable, the cable therefore has to be threaded through this circular hole of the guide unit. Such guide units having circular holes are known from DE 10 2009 031 076 B3, for example. This threading is usually performed by hand and is very elaborate. In particular, when processing cables having different diameters, the guide units often need to be changed because the radius of the hole needs to be matched to the diameter of the cable, since when the diameter of the hole is too small the cable gets stuck and simply cannot pass through, and when the diameter is too large the clearance is large such that high-quality processing of the cable is no longer ensured.

The problem addressed by the invention is that of providing a cable processing machine and a method for laying a cable in a cable processing machine, in which machine and method it is particularly easy to carry out a cable change.

SUMMARY

According to the invention, the cable feeding device comprises a first guide element and a second guide element, between which the cable is guided at least in an operating mode of the cable processing machine. The spacing between the two guide elements is selectively variable.

By the guide unit being formed not, as known, integrally, but rather by two guide elements of which the spacing relative to each other is variable, the cable can be easily laid in the cable processing machine by setting an initially large spacing and the cable can then still be safely guided by decreasing the spacing, and therefore high-quality processing of the cable is possible. In particular, it is therefore no longer necessary to change the guide unit depending on the cable diameter.

The operating mode is understood in particular to mean the mode in which the cable processing machine is operated during operation, i.e. the mode in which a cable is processed by means of the cable processing machine.

The cable feeding device comprises in particular a first and a second belt drive, between which the cable is guided, it being possible to move the cable in the feed direction by contact with driven belts of the belt drives.

The two guide elements are arranged in particular upstream, seen in the feed direction, of the belt drives. Alternatively, the guide elements can also be arranged downstream of the belt drives. In a particularly preferred embodiment, the guide elements are arranged upstream of a cable-length-measuring device.

In a preferred embodiment of the invention, the two guide elements are arranged at a first spacing relative to each other in a cable laying mode for laying a cable and are arranged at a second spacing relative to each other in the operating mode, the second spacing being smaller than the first spacing. As a result, the cable can be easily laid in the machine at the larger first spacing and then it is possible to safely guide the cable by setting the second spacing. In particular, the second spacing depends on the diameter of the cable, i.e. depending on the cable diameter in particular different spacings between the guide elements can be set during the operating mode, meaning that optimal guiding of the cable is ensured in each case.

It is further advantageous if the guide elements are designed such that, when they are arranged in the position having the second spacing, i.e. in the operating mode, the cable is surrounded on all sides, and therefore the cable is guided in all directions.

Conversely, the guide elements in the cable laying mode are arranged and designed such that, in the cable laying mode, a gap through which the cable can be laid is formed between the two guide elements on a predetermined side. In particular, the gap is formed at the top, such that the cable can be laid in the cable processing machine from above. This allows the cable to be laid in a particularly simple manner.

In a preferred embodiment of the invention, the first guide element is arranged on a housing of the cable processing machine in a stationary manner, the second guide element being arranged in a movable manner relative to the first guide element and thus also relative to the housing of the cable processing machine. Only one of the two guide elements thus needs to be moved to set the spacing between the guide elements.

In a particularly preferred embodiment of the invention, the cable feeding device comprises a first belt drive, which is arranged on a housing of the cable processing machine in a stationary manner. The cable feeding device further has a second belt drive, which is fastened to a carrier that is movable relative to the housing. By moving the carrier, the cable feeding device can be opened and closed, the open state being used in particular to lay a cable between the belt drives from above and the closed state being used during operation of the cable processing machine. The second guide element is in particular also arranged on the carrier. This has the advantage that the spacing between the two guide elements is automatically altered when opening and closing the belt drive, meaning that when the belt drives are open the spacing between the two guide elements is also large enough for the cable to be able to be laid from above, and by closing the belt drives the two guide elements are automatically moved toward each other such that the cable is safely guided by the elements.

In an alternative embodiment of the invention, both guide elements can be designed to be movable relative to the housing of the cable processing machine. As a result, the range of motion of the guide elements is increased.

The guide elements can be in particular translationally movable relative to each other. In particular, one of the two guide elements is moved linearly relative to the other. Alternatively, both guide elements can be moved relative to each other.

In an alternative embodiment of the invention, the guide elements can also be designed to be pivotable relative to each other to alter the spacing.

In a particularly preferred embodiment of the invention, the guide elements are designed such that they each have a substantially L-shaped cross section.

In this case, the guide elements each have in particular two contact surfaces arranged perpendicularly to each other for making contact with and thus guiding the cable. In this case, the guide elements are arranged relative to each other such that in each case one of the contact surfaces of one guide element is arranged parallel to a contact surface of the second guide element and, overall, guiding on all sides is achieved by the four guide surfaces. The guiding on all sides is thus achieved in a particularly simple manner.

In a preferred embodiment of the invention, the cable feeding device has, at the outlet, i.e. at the downstream end of the cable feeding device, a guide tube through which the cable passes. This guide tube comprises a brake unit, which, in a braking state, retains the cable, as a result of which the cable is prevented from moving relative to the guide tube. In particular, the cable is clamped by the brake unit.

As a result, when the cable is laid in the cable processing machine, the cable is not movable relative to the guide tube, and therefore the guide tube can be easily gripped and inserted into a tube holder, without the cable needing to be held at the same time. As a result, laying the cable, in particular laying between the belt drives and the guide elements from above, is further simplified.

The brake unit is designed in particular such that it comprises a spring, which in a first state, together with the housing of the guide tube, in particular the inside of the housing of the guide tube, clamps the cable and in a second state no longer provides clamping.

The spring is in particular in the form of a leaf spring, which is arranged in a recess in the guide tube and thus engages through the housing of the guide tube into the inner guide channel and thus can ensure that the cable is clamped.

It is further advantageous if, when a clamping lever via which the guide tube can be clamped in a tube holder of the cable feeding device is closed, the brake unit is automatically released when the clamping lever is closed. A mechanism that releases the brake unit therefore does not need to be additionally provided. In particular, therefore, the release cannot be forgotten and no additional work step is required therefor.

In an alternative embodiment of the invention, an active element can be provided on the tube holder, by means of which element the brake unit is released.

Another aspect of the invention relates to a method for laying a cable in a cable processing machine. In this method, a cable is first slid into a guide tube. The guide tube is then inserted into a tube holder of the cable processing machine.

The cable is then laid, in particular from above, between two belt drives of a cable feeding device of the cable processing machine and between two guide elements for guiding the cable. The two belt drives are then moved toward each other and thus closed. The guide elements are likewise moved toward each other, such that the cable is guided by the elements.

The movement of the belt drives and the guide elements toward each other can take place in particular in parallel by at least one of the movable belt drives and one of the guide elements being arranged on the same carrier.

The movement of the belt drives or the guide elements toward each other can be understood to mean both that the two belt drives and the two guide elements are moved relative to a housing of the cable processing machine in each case or that only one of the belt drives and one of the guide elements is moved, while the relevant other belt drive and other guide element are arranged in a stationary manner.

In a preferred embodiment, the cable is clamped into the guide tube when it is slid in or clamped by means of a brake unit of the guide tube after being slid in, meaning that a movement of the cable relative to the guide tube is prevented. After or during insertion of the guide tube into the tube holder, the brake unit is released again. In this case, the brake unit is preferably automatically released during insertion.

In particular, the above-described method is carried out using one of the above-described cable processing machines.

Additional features and advantages of the invention which explain the invention in connection with the attached figures in greater detail can be found in the following description.

DETAILED DESCRIPTION

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
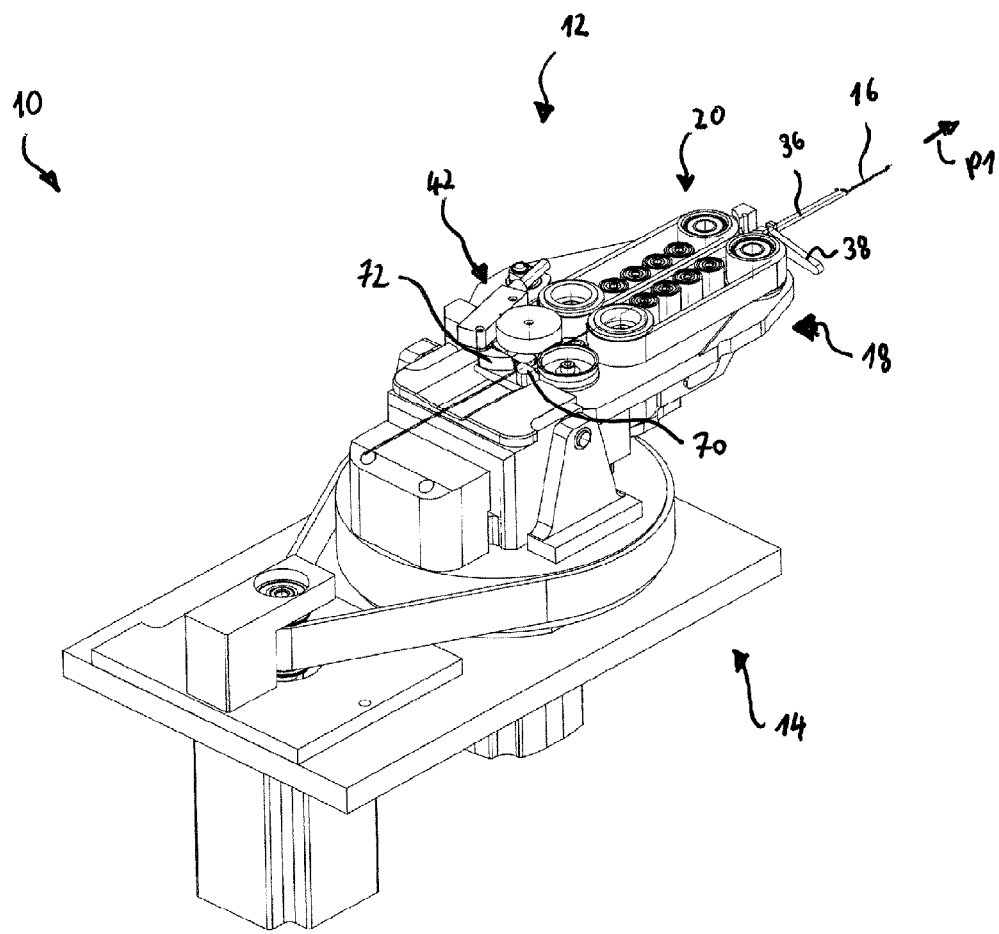
FIG. 1 is a schematic, perspective view of a detail of a cable processing machine in an operating mode.

FIG. 1 is a schematic, perspective view of a detail of a cable processing machine 10, in particular a cable feeding device 12 being shown, by means of which the cable 16 is movable in a feed direction P1. In the cable processing machine 10 shown in FIG. 1, the cable feeding device 12 is in the form of part of a pivot and discharge unit 14. In an alternative embodiment of the invention, the cable feeding device 12 can also be formed separately from the pivot and discharge unit 14.

The cable feeding device 12 has a first belt drive 18 and a second belt drive 20.

Figure 2:
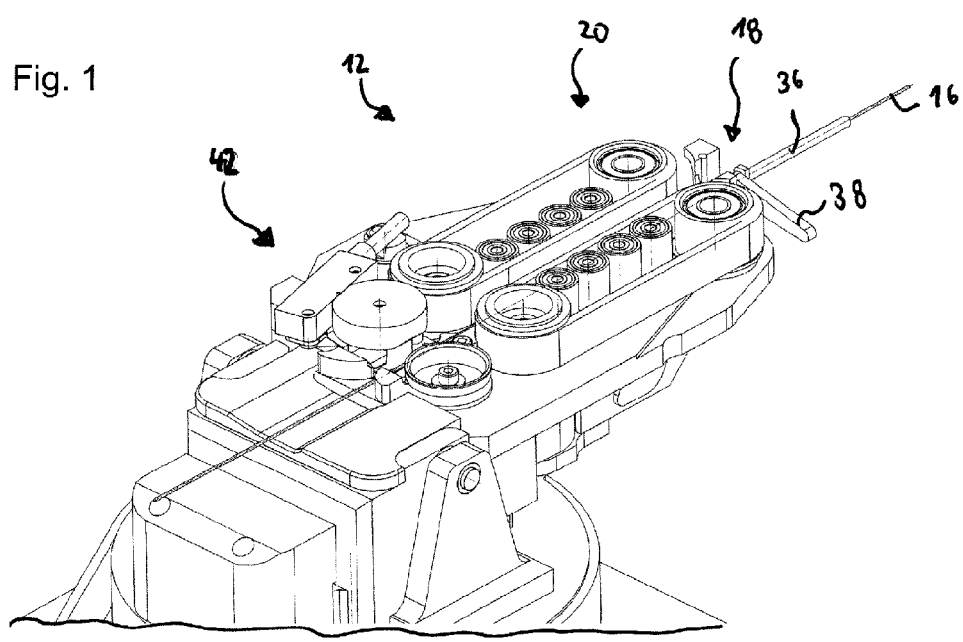
FIG. 2 is a schematic, perspective view of a detail of the cable processing machine according to FIG. 1 in a cable laying mode.

FIG. 1 shows the cable processing machine 10 in an operating mode, in which the belt drives 18, 20 are closed and the cable 16 is moved in the feed direction P1 by means of the belt drives 18, 20 and the cable 16 is processed. In contrast, FIG. 2 shows a detail of the cable processing machine 10 in a cable laying mode, in which the two belt drives 18, 20 are open, i.e. a spacing is formed between them, through which the cable 16 can be inserted.

Figure 3:
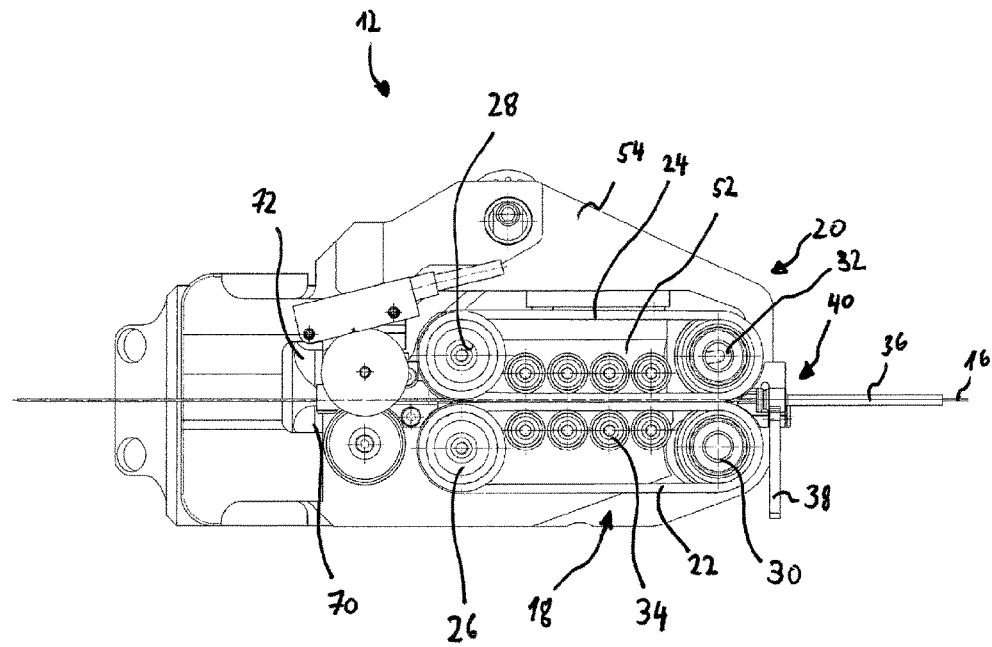
FIG. 3 is a plan view of the cable feeding device of the cable processing machine according to FIG. 1 and FIG. 2.

FIG. 3 is a plan view of the cable feeding device 12. The two belt drives 18, 20 each have a transmission belt 22, 24, between which transmission belts the cable 16 is clamped and by means of which the cable 16 is moved in the feed direction P1. The two transmission belts 22, 24 are driven by a particular driving roller 26, 28 and by a particular guide roller 30, 32 and are supported by four support rollers in each case, one of which is denoted by the reference sign 34 by way of example.

The cable processing machine 10 further has a guide tube 36 which, seen in the feed direction P1, is arranged after the belt drives 18, 20, i.e. downstream of the belt drives 18, 20, and can be fasted in a tube holder 40 using a clamping lever 38.

Figure 4:
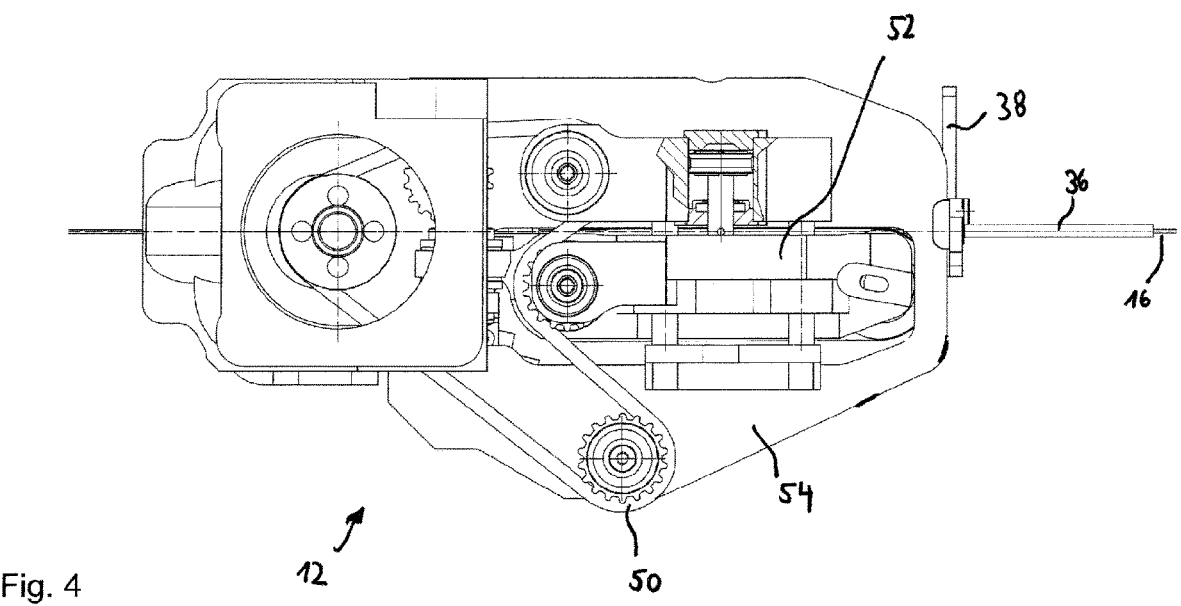
FIG. 4 is a view from below of the cable feeding device according to FIG. 3 in the operating mode.
Figure 5:
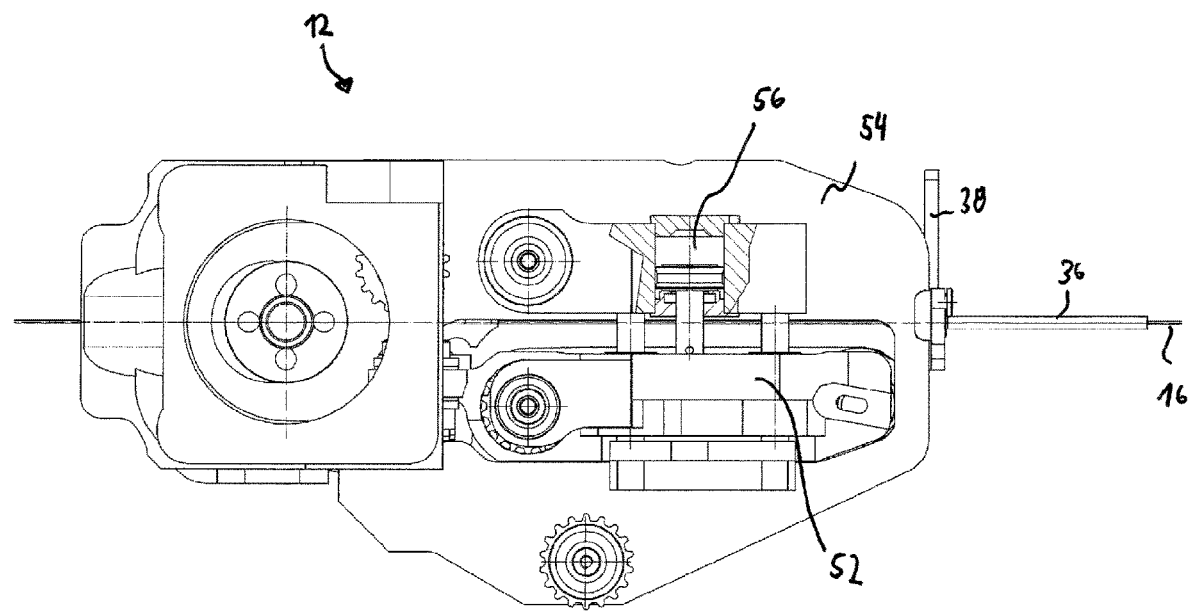
FIG. 5 is another view from below of the cable feeding device according to FIG. 3 in the cable laying mode.

FIGS. 4 and 5 are each views from below of the cable feeding device 12, FIG. 4 showing the operating mode and FIG. 5 showing the cable laying mode. A driven power transmission belt 50, which is in the form of a toothed belt and by means of which the two driving rollers 26, 28 can be driven, is provided at the bottom.

In addition, a housing 54 of the cable processing machine is shown, on which housing the first belt drive 18 is arranged in a stationary manner. In contrast, the second belt 20 is arranged on a carrier 52 which, as shown in FIG. 4 and FIG. 5, can be moved using a pneumatic cylinder 56 relative to the housing 54, as a result of which the second belt drive 20 is movable, and therefore the spacing between the belt drives 18, 20 can be set and the cable feeding device 12 can be shifted between the cable laying mode and the operating mode.

A length-measuring system 42 is arranged upstream of the belt drives 18, 20. Two guide elements 70, 72 for guiding the cable 16 in the region of the inlet are provided further upstream of the length-measuring system 42.

Figure 6:
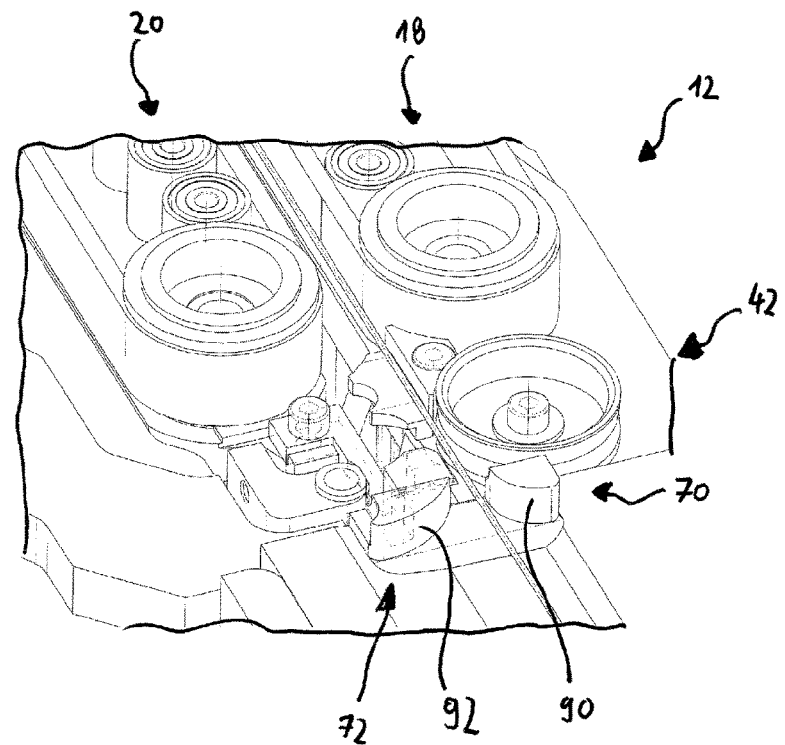
FIG. 6 is a detail of the cable processing machine according to FIG. 1 and FIG. 5 with a view of two guide elements in the cable laying mode.
Figure 7:
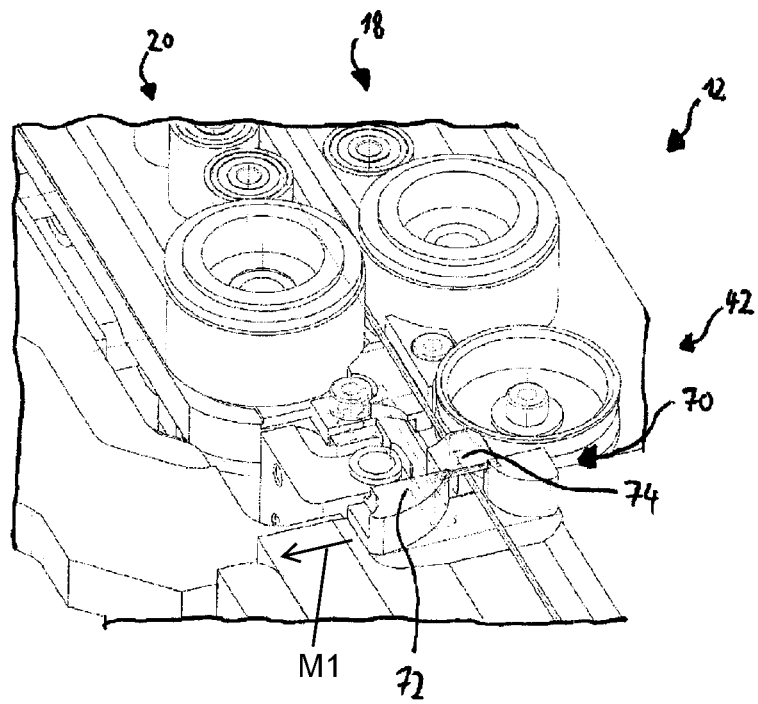
FIG. 7 is a detail of the cable processing machine according to FIG. 1 and FIG. 6 with a view of the guide elements in the operating mode.
Figure 8:
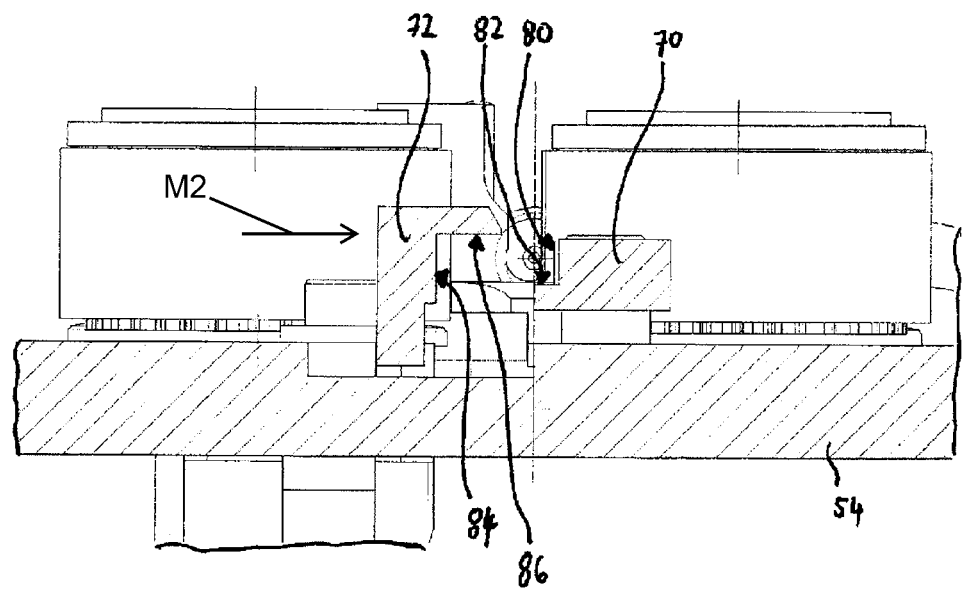
FIG. 8 is a cross section through the guide elements in the cable laying mode.
Figure 9:
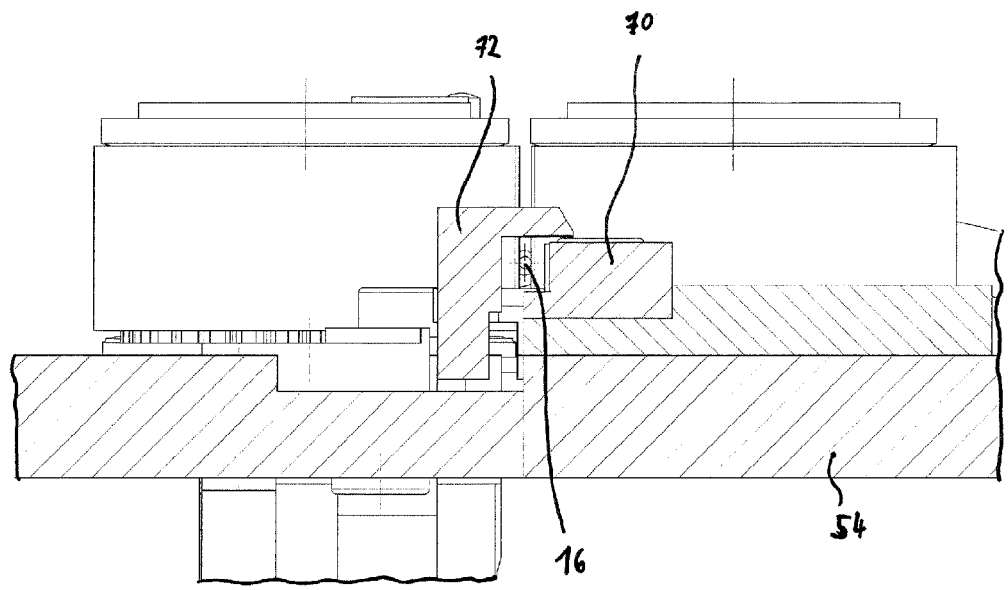
FIG. 9 is a cross section through the guide elements in the operating mode.

FIGS. 6 and 7 each show a detail of the cable feeding device 12 with a view of the two guide elements 70, 72, FIG. 6 showing the cable laying mode and FIG. 7 showing the operating mode. FIGS. 8 and 9 each show a cross section through the cable feeding device 12, in particular the two guide elements 70, 72, FIG. 8 in turn showing the cable laying mode and FIG. 9 showing the operating mode.

The first guide element 70 is arranged in a stationary manner relative to the housing 54 of the cable processing machine 10 and thus also relative to the first belt drive 18. In contrast, the second guide element 72 is arranged on the carrier 52 and is thus moved together with the second belt drive 20 in the direction of the arrow M1 in FIG. 7 when the belt drives 18, 20 are opened or in the direction of the arrow M2 in FIG. 8 when the belt drives 18, 20 are closed. For a belt drive that alternatively opens on two sides, both guide elements 70, 72 can also be moved.

As can be seen in FIGS. 8 and 9, the guide elements 70, 72 are substantially L-shaped, the two guide elements each having a vertical guide surface 80, 84 and a horizontal guide surface 82, 86. The vertical guide surfaces 80, 84 are used to laterally guide the cable, while the horizontal guide surfaces 82, 86 are used to guide the cable upward or downward.

The movable guide element 72 further has a lug 74, the horizontal guide surface 86 of the second guide element 72 forming the lower periphery of the lug 74, which, in the closed state, guides the cable 16 upward. By contrast, in the open state, i.e. in the cable laying mode, the lug 74 is moved away from the first guide element 70 far enough that the cable 16 can be laid from above.

Respective inlet parts 90, 92 are provided on the upstream ends of the guide elements 70, 72, which parts have rounded surfaces through which the cable is guided when entering the guide elements 70, 72.

In an alternative embodiment of the invention, more than two guide elements 70, 72 can also be provided. In particular, at other points on the conveying path of the cable 16, additional guide element pairs of this kind can be provided which likewise guide the cable 16 at the appropriate points.

Furthermore, it is alternatively possible for the two guide elements 70, 72 to be arranged between the two belt drives 18, 20 and the length-measuring unit 42 or also after the belt drives 18, 20.

Figure 10:
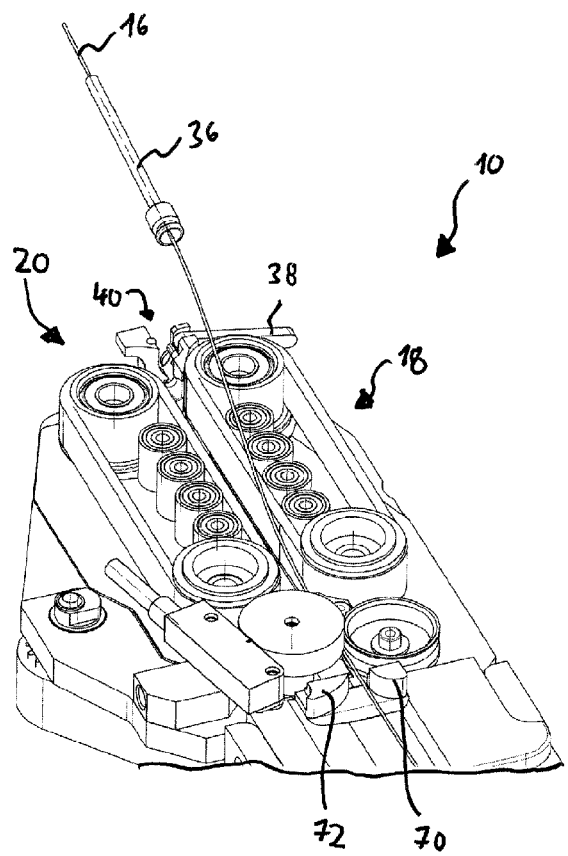
FIG. 10 is a detail of the cable processing machine according to FIG. 1 to FIG. 9 with the guide tube released.

FIG. 10 is a schematic, perspective view of a detail of the cable processing machine 10, the guide tube 16 being released from the tube holder 40.

Figure 11:
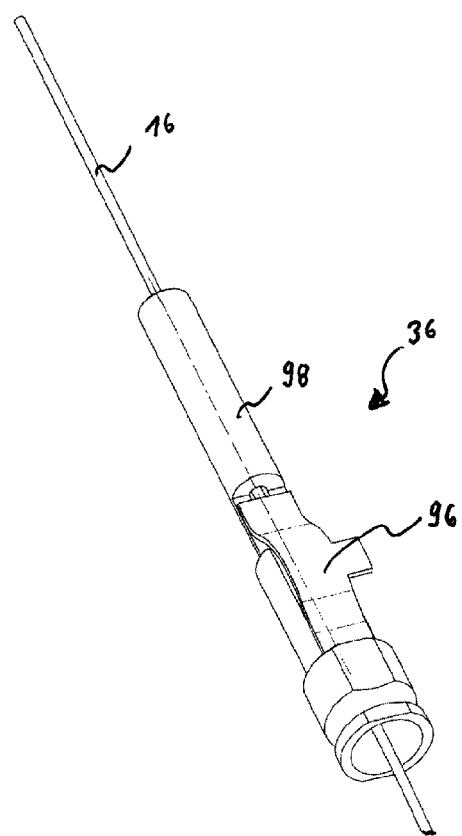
FIG. 11 is a schematic, perspective view of the guide tube of the cable processing machine according to FIG. 1 to FIG. 10.

FIG. 11 is a schematic, perspective view of the guide tube 36. The guide tube 36 has a brake unit in the form of a leaf spring 96, which brake unit projects through a recess in a housing 98 of the guide tube 36 and thus, in a braking state, clamps the cable 16 and thus prevents movement of the cable 16 relative to the guide tube 36.

The brake unit 96 can be in particular automatically released when the clamping lever 38 is closed after insertion into the tube holder 40. Alternatively, an active element can be provided on the tube holder 40, which element releases the brake unit 96.

Overall, it is possible for the cable 16 to be laid in a particularly simple manner by means of the above-described cable processing machine 10. For this purpose, the cable is first inserted into the guide tube 36 and clamped in place by the brake unit 96. The cable 16 can thus be easily gripped by the guide tube 36. The guide tube 36 is subsequently inserted into the tube holder 40, and the clamping lever 38 is closed. Here, the brake unit 96 is in particular released.

In addition, the cable is laid from above between the open belt drives 18, 20 and the likewise open guide elements 70, 72. The belt drives 18, 20 and thus automatically also the guide elements 70, 72 are subsequently closed, and therefore the cable 16 is now being guided and can be moved in the feed direction P1 by means of the belt drives 18, 20.

In an alternative embodiment, the guide tube 36 can also be formed without a brake unit 96. In that case, steps involving the brake unit 96 are correspondingly omitted in the above-described method.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A cable processing machine including a cable feeding device for moving a cable in a feed direction, the cable feeding device comprising:
    a first guide element;
    a second guide element, the cable being guided between the two guide elements at least in an operating mode of the cable processing machine, and wherein a spacing between the two guide elements is selectively variable; and
    wherein the first and second guide elements are positioned upstream of a pair of belt drives moving the cable in the feed direction; and
    wherein the two guide elements have a first spacing relative to each other in a cable laying mode of the cable processing machine for laying the cable and have a second spacing relative to each other in the operating mode, and wherein the second spacing is smaller than the first spacing.

2. The cable processing machine according to claim 1 wherein the two guide elements together surround the cable on all sides in the operating mode.

3. The cable processing machine according to claim 1 wherein in the cable laying mode, a gap for the passage of the cable during laying is formed between the two guide elements on a predetermined side of the two guide elements.

4. The cable processing machine according to claim 3 wherein in the predetermined side is a top side.

5. The cable processing machine according to claim 1 wherein the first guide element is arranged stationary relative to a housing of the cable processing machine and the second guide element is movable relative to the first guide element.

6. The cable processing machine according to claim 5 including a first belt drive of the pair of belt drives arranged stationary on the housing of the cable processing machine, a second belt drive of the pair of belt drives fastened to a carrier that is movable relative to the housing, and the second guide element is arranged on the carrier.

7. The cable processing machine according to claim 1 wherein the two guide elements are movable relative to a housing of the cable processing machine.

8. The cable processing machine according to claim 1 wherein the two guide elements are translationally movable relative to each other.

9. The cable processing machine according to claim 1 wherein each of the two guide elements is L-shaped in cross section.

10. The cable processing machine according to claim 1 wherein the two guide elements each have two contact surfaces arranged perpendicularly to each another for making contact with and guiding the cable, and wherein one of the contact surfaces of the first guide element and one of the contact surfaces of the second guide element are arranged parallel to one another.

11. The cable processing machine according to claim 1 wherein the cable feeding device has, at the outlet, a guide tube through which the cable is guided, and the guide tube includes a brake unit that, in a braking state, retains the cable.

12. The cable processing machine according to claim 11 wherein the brake unit includes a spring.

13. The cable processing machine according to claim 12 wherein the spring is a leaf spring.

14. The cable processing machine according to claim 11 wherein the brake unit is automatically opened when a clamping lever for fastening the brake unit to the cable processing machine is closed.

15. The cable processing machine according to claim 1 wherein each of the first and second guide elements has an upstream end with a rounded surface.

16. A method for laying a cable in a cable processing machine comprising the steps of:
    sliding a cable into a guide tube;
    inserting the guide tube into a tube holder of the cable processing machine, wherein the guide tube is releasably retained by the tube holder;
    laying the cable between two belt drives and between two guide elements of the cable processing machine;
    moving the belt drives toward each other; and
    moving the guide elements toward each other.

17. The method according to claim 16 including clamping the cable in the guide tube with a brake unit of the guide tube and releasing the brake unit either after the guide tube has been inserted into the tube holder or while the guide tube is being inserted into the tube holder.

18. A cable processing machine including a cable feeding device for moving a cable in a feed direction, the cable feeding device comprising:
    a first guide element;
    a second guide element, the cable being guided between the two guide elements at least in an operating mode of the cable processing machine, and wherein a spacing between the two guide elements is selectively variable;
    wherein the two guide elements have a first spacing relative to each other in a cable laying mode of the cable processing machine for laying the cable and have a second spacing relative to each other in the operating mode, and wherein the second spacing is smaller than the first spacing;
    wherein the two guide elements together surround the cable on all sides in the operating mode; and
    wherein in the cable laying mode, a gap for the passage of the cable during laying is formed between the two guide elements on a predetermined side of the two guide elements.

* * * * *